United States Patent [19]

Okuyama et al.

[11] 4,310,233
[45] Jan. 12, 1982

[54] FILM FEED DETECTING DEVICE OF A CAMERA

[75] Inventors: Takeshi Okuyama, Kawasaki; Toshiaki Hozumi, Tokyo; Hiroshi Wakabayashi, Yokohama, all of Japan

[73] Assignee: Nippon Kogaku K.K., Tokyo, Japan

[21] Appl. No.: 195,492

[22] Filed: Oct. 9, 1980

[30] Foreign Application Priority Data

Oct. 13, 1979 [JP] Japan ................................ 54/132175
Dec. 28, 1979 [JP] Japan ................................ 54/172192
Dec. 28, 1979 [JP] Japan ................................ 54/172193

[51] Int. Cl.³ .......................... G03B 1/04; G03B 17/26
[52] U.S. Cl. ..................................... 354/212; 354/275
[58] Field of Search ............... 354/173, 275, 217, 218, 354/212–215, 202, 204, 205, 206; 242/71, 71.1, 74, 74.1, 74.2

[56] References Cited

U.S. PATENT DOCUMENTS

| | | | |
|---|---|---|---|
| 3,364,832 | 1/1968 | Engelsmann et al. | 354/202 |
| 3,567,147 | 3/1971 | Engelsmann et al. | 242/71.1 |
| 3,589,637 | 6/1971 | Wagner | 242/71.1 |
| 3,878,546 | 4/1975 | Adamski | 354/173 |
| 4,171,893 | 10/1979 | Kawazoe | 354/173 |

Primary Examiner—Donald A. Griffin
Attorney, Agent, or Firm—Fitzpatrick, Cella, Harper & Scinto

[57] ABSTRACT

In a film feeding device of a camera including a take-up spool adapted to be rotated by a wind-up operating device to thereby take up on the outer periphery thereof a roll film loaded into a supply chamber, the film having an image recording portion and a leader portion of a smaller width than the recording portion, the image recording portion being taken up in subsequence to the take-up of the leader portion onto the take-up spool, the take-up spool having an outer peripheral surface which is not covered with the leader portion but can be covered only with the image recording portion, there is provided means cooperable with the outer peripheral surface of the take-up spool to detect the take-up of the film, the detecting means including signal means provided on said outer peripheral surface and signal detecting means engageable with the signal means and removed from said outer peripheral surface by the intervention of the image recording portion of the film with respect to said outer peripheral surface, and means for biasing the signal detecting means in the direction of engagement thereof with the signal means.

10 Claims, 9 Drawing Figures

FILM FEED DETECTING DEVICE OF A CAMERA

BACKGROUND OF THE INVENTION

1. Field of the Invention

This invention relates to a device for detecting and confirming the feed of a film in a camera using a roll film.

2. Description of the Prior Art

In a camera having a film feeding device for drawing out a roll film from a film magazine, a cassette or the like and winding the film on a film take-up spool after the film has passed the imaging plane of an object, if the film is not positively engaged with the take-up spool and sprocket during the loading of the film, the feed of the film by the manual operation of a film advance lever or the wind-up operation by an electric driving device cannot be accomplished. Accordingly, before photographing, it is necessary to confirm that the engagement of the film with the take-up spool has been positively effected in order to provide normal feeding of the film. To confirm the positive engagement of the film with the take-up spool in the film feeding device of such camera, a visual confirmation method has been largely adopted such as monitoring from outside of the camera the rotation of a rewinding crank shaft rotated with the shaft of a film magazine. However, such confirmation method is liable to be omitted and such omission has often resulted in a failure.

In recent years, with the advance of the automatization of cameras, various propositions have been made to the take-up spool and other parts so as to enable the engagement of the film with the take-up spool to be accomplished simply and positively. Also, various cameras provided with an easy loading device for film are known. Especially, there is known a camera in which, simply by placing the leader portion of a film on the peripheral surface of the take-up spool and closing the back lid of the camera, the film is taken up on the spool. In this camera, the leader portion of the film is urged against the rubber-filmed peripheral surface of the spool to prevent the film from separating from the spool. However, in the existing circumstances, there is no technique of ensuring complete film loading even for the installation of the film leader portion onto the rubber-filmed peripheral surface of the spool by the photographer in an incomplete form (for example, placing the film leader portion obliquely with respect to the shaft of the spool) or for unexpected happenings such as damage to the film leader portion.

SUMMARY OF THE INVENTION

It is the object of the present invention to provide an improved device for detecting the engagement of a film with the take-up spool and confirming the feeding of the film.

The invention will become fully apparent from the following detailed description thereof taken in conjunction with the accompanying drawings.

DESCRIPTION OF THE PREFERRED EMBODIMENTS

A first embodiment of the present invention will hereinafter be described with reference to the drawings.

Figure 1:
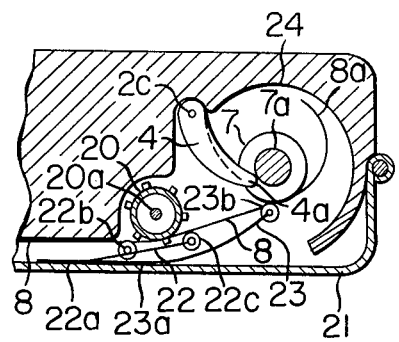
FIG. 1 is a horizontal cross-sectional view of essential portions of the device according to a first embodiment of the present invention.

In FIG. 1, the perforations of a film 8 drawn out of a film magazine 9 are brought into engagement with the pawls of a sprocket 20 and the leader portion 8a of the film is placed on the peripheral surface of a take-up spool 7 covered with rubber, whereafter a back lid 21 is closed. A plate spring 22 having one end 22a secured to the back lid 21 rotatably holds rollers 22b and 22c at the intermediate portion and the other end portion thereof, respectively. These rollers 22b and 22c urge the film 8 against the sprocket 20 with the aid of the bias force of the plate spring 22 to thereby ensure the engagement between the film and the sprocket. A plate spring 23 having one end 23a secured to the back lid 21 rotatably holds a roller 23b at the other end thereof, and this roller 23b urges the film 8 against the peripheral surface of the spool 7 with the aid of the bias force of the spring 23. Thus, the film 8 is positively held between the rubber peripheral surface of the spool 7 and the roller 23b. When the sprocket 20 and the spool 7 are rotated from this state manually or by a motor through a known gear train, the film leader portion 8a is fed along the guide wall 24 of a spool chamber. When the film leader portion 8a is further fed, the leading end thereof advances toward the spool 7 along the surface of a film guide 4 and comes between the roller 23b and the peripheral surface of the spool 7, and the film portion newly fed is wound thereon. Then, the film 8 is taken up double or triple on the spool 7. The spool 7, like a conventional spool, is connected to a drive shaft through a friction clutch, and the peripheral speed thereof is greater than that of the sprocket 20. Accordingly, the film 8 is closely taken up without slack. As will be seen from the foregoing description, this device does not require the procedure of mounting the film leader portion 8a on the take-up stool.

Figure 2:
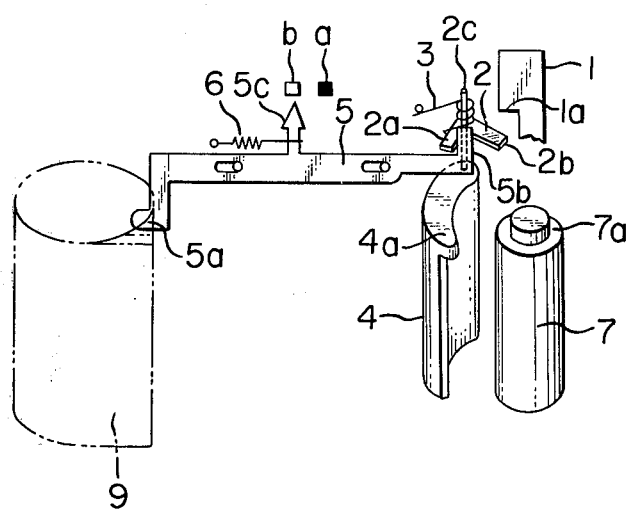
FIGS. 2 to 4 are perspective views for illustrating the operation of the first embodiment.

In FIG. 2, the sprocket 20, the back lid 21, etc. shown in FIG. 1 are omitted. In FIG. 2, a slidable magazine detecting lever 5 biased leftwardly by a spring 6 has an end portion 5a projected into the containing chamber for film magazine provided in the camera body. An L-shaped release lock lever 2 with which a rotary shaft 2c secured to the center of rotation of a film guide 4 is integrally formed is biased counter-clockwisely by a spring 3 having a bias force smaller than that of the spring 6, and has an arm 2a engageable with a hook portion 5b provided at the end of the magazine detecting lever 5. The engagement between the hook portion 5b and the arm 2a occurs when no film magazine is present in the containing chamber and, at this time, the lever 2 is in a position in which it has been rotated clockwisely with the rotary shaft 2c by the bias force of the spring 6, and the other arm 2b of the lever is in a position in which it has been retracted from the course of the stepped portion 1a of a release plate 1 downwardly slidable by a release button, not shown. Accordingly, when there is no film magazine loaded into the containing chamber, the release plate 1 can be lowered by depression of the release button and the shutter release becomes possible. This is convenient in that the operation of the camera can be checked up.

Figure 3:
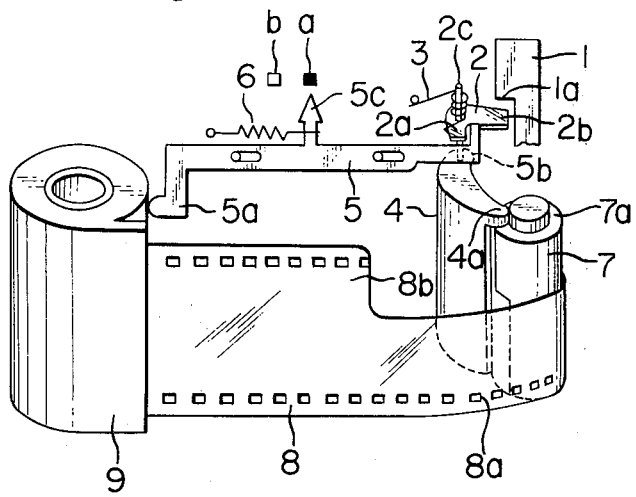

As shown in FIG. 3, when a film magazine is placed into the containing chamber, the end 5a of the detecting lever 5 projected into the containing chamber is pushed rightwardly by the magazine. Accordingly, the lock lever 2 released from the restraint of the hook portion 5b of the detecting lever is rotated counter-clockwisely with the rotary shaft 2c by the force of the spring 3. The film guide 4 formed integrally with the rotary shaft 2c is also rotated until it bears against the spool 7. At the same time, the other arm 2b of the lock lever 2 advances into the course of the stepped portion 1a of the release plate 1, thus blocking the sliding movement of the release plate 1. Accordingly, the shutter release becomes impossible. By this rotation, a projection 4a provided in the upper portion of the film guide 4 fits into a fitting groove 7a provided over the entire periphery of the upper portion of the spool 7. The fitting groove 7a is provided at the location of the spool 7 which cannot contact the film leader portion 8a and can contact the wider portion 8b of the film. When the film is further fed from the position of FIG. 3 in which the film leader portion has been wound on the spool 7, the film leader portion 8a is substantially completely wound under the film portion newly fed, and the wider portion 8b of the film 8 comes to be taken up on the spool 7. At this time, the wider portion 8b contacts the projection 4a and rotates the film guide 4 clockwisely against the bias force of the spring 3, thus causing the projection 4a to be disengaged from the fitting groove 7a. The lock lever 2 integral with the film guide 4 is also rotated clockwisely to retract the other arm 2b from the course of the release plate 1. Thus, the shutter release becomes possible.

After the film 8 is taken up on the spool 7 to such extent, the film is reliably fed.

As is apparent from what has been described above, in the present embodiment, the mechanism for detecting the wider portion 8b of the film wound on the spool 7 is constituted by the projection 4a provided on the film guide and the fitting groove 7a provided in the spool 7. This detecting mechanism becomes capable of detection only when the lever 5 detects that a film magazine is contained in the containing chamber of the camera. The detecting mechanism detects from the fitting of the projection 4a into the fitting groove 7a that the film is not positively taken up on the spool 7 and, at that time, it effects the release lock of the shutter by the detection output. The detecting mechanism detects from the disengagement of the projection 4a from the fitting groove 7a that the film has been positively taken up on the spool 7 and, at that time, it releases the release lock of the shutter by the detection output.

Figure 5:
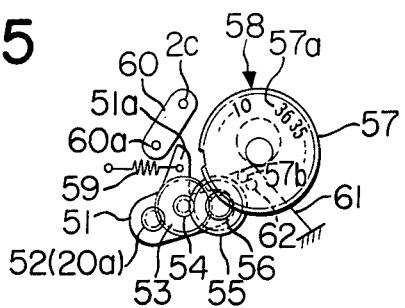
FIGS. 5 to 7 are plan views showing the film counter mechanism according to a first embodiment.
Figure 6:
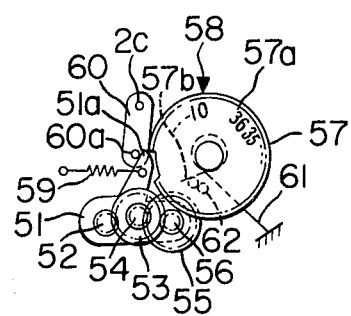
Figure 7:
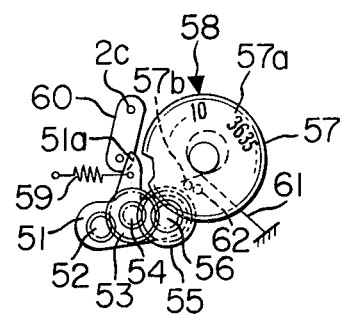

FIGS. 5 to 7 show a film counter mechanism operatively associated with the detecting mechanism for the wider portion of the film. In FIG. 5, a gear train 52–56 is supported on a support plate 51 swingably supported on the shaft 20a of the sprocket shown in FIG. 1. The gear 52 is rotated with the sprocket shaft 20a and this rotation is decelerated through the gears 53–56 and transmitted to a gear 57 having a number display plate 57a provided on the upper surface thereof. By the rotation of the sprocket for transporting the film, the gear 52 is rotated counter-clockwisely. This rotation causes the gears 53–56 to rotate the gear 57 clockwisely. Each time the film is fed by one frame, the gear 57 is rotated so that the numerals representing the photograph numbers and opposed to an index mark 58 provided in the fixed portion are incremented one by one. The mesh engagement between said gears is ensured by a spring 59 which biases the support plate 51 counter-clockwisely. A swingable plate 60 is secured to the rotary shaft 2c and swings with the film guide 4 and the release lock lever 2. The swingable plate 60 has a pin 60a which can contact a projected portion 51a provided on the support plate 51 and, when the projection 4a of the film guide 4 fits in the fitting groove 7a of the spool 7, the pin 60a is not in contact with the projected portion 51a and, when the projection 4a is out of engagement with the fitting groove 7a, the pin 60a contacts the projected portion 51a to rotate the support plate 51 clockwisely against the bias force of a spring 59 and break the mesh engagement between the gears 56 and 57, as shown in FIG. 6. At this time, the gear 57 is biased by a spring 61 and rotated counter-clockwisely until a pin 57b studded in the lower surface of the gear 57 bears against a pin 62 studded in the fixed portion. At this time, the display of the photograph number indicated by the index mark 58 shows that the film is unphotographed.

The condition shown in FIG. 5 is brought about by the disengagement of the projection 4a of the film guide 4 from the fitting groove 7a of the spool 7 which occurs due to the film magazine 9 being not contained in the containing chamber. The pin 60a of the swingable plate 60 is not bearing against the projected portion 51a of the support plate 51. Accordingly, the rotation of the sprocket is transmitted through the gear train 52–56 to the gear 57 and thus, the film counter mechanism operates.

When, as shown in FIG. 3, the film magazine 9 is contained and only the leader portion 8a of the film 8 has been taken up on the spool 7, namely, when the take-up is incomplete, the projection 4a fits into the fitting groove 7a to bring about the condition shown in FIG. 6. The pin 60a of the swingable plate 60 bears against the projected portion 51a of the support plate 51 and clockwisely pivots the same, thereby breaking the mesh engagement between the gears 56 and 57. Accordingly, the film counter mechanism does not operate.

Figure 4:
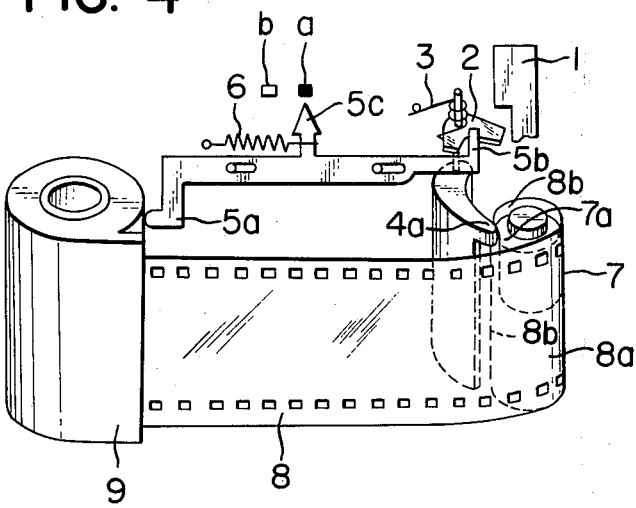

When, as shown in FIG. 4, the film leader portion 8a is further taken up on the spool 7 from the condition of FIG. 3 and the projection 4a has detected the wider portion 8b of the film, namely, when the film has been positively taken up, the projection 4a is disengaged from the fitting groove 7a. At this time, the film counter mechanism assumes the position as shown in FIG. 7. The swingable plate 60 swings clockwisely and the pin 60a returns to its non-contact position with the projected portion 51a of the support plate 51. Accordingly, the gears 56 and 57 mesh with each other again and the film counter mechanism becomes operative.

According to the above-described mechanism, after the film magazine has been loaded into the camera, only when the film has been positively taken up on the spool, the film counter mechanism becomes operative and thus, the film counter also displays the taken-up condition of the film.

During the film rewind operation after termination of photography, when the wider portion 8b of the film is rewound from the spool 7, the projection 4a fits into the fitting groove 7a. At that time, the gears 56 and 57 of the film counter mechanism break the mesh engagement therebetween, so that the gear 57 rotates counter-clockwisely until the pin 57b bears against a fixed pin 62.

Thus, it resets the photograph number display on the number display plate 57a. Accordingly, by confirming this reset operation of the film counter, one can know that the rewind has been positively effected.

Figure 8:
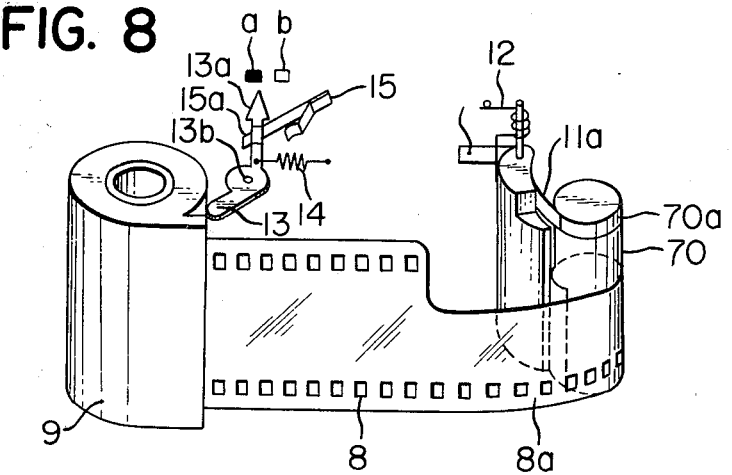
FIG. 8 is a perspective view of the device according to a second embodiment of the present invention.
Figure 9:
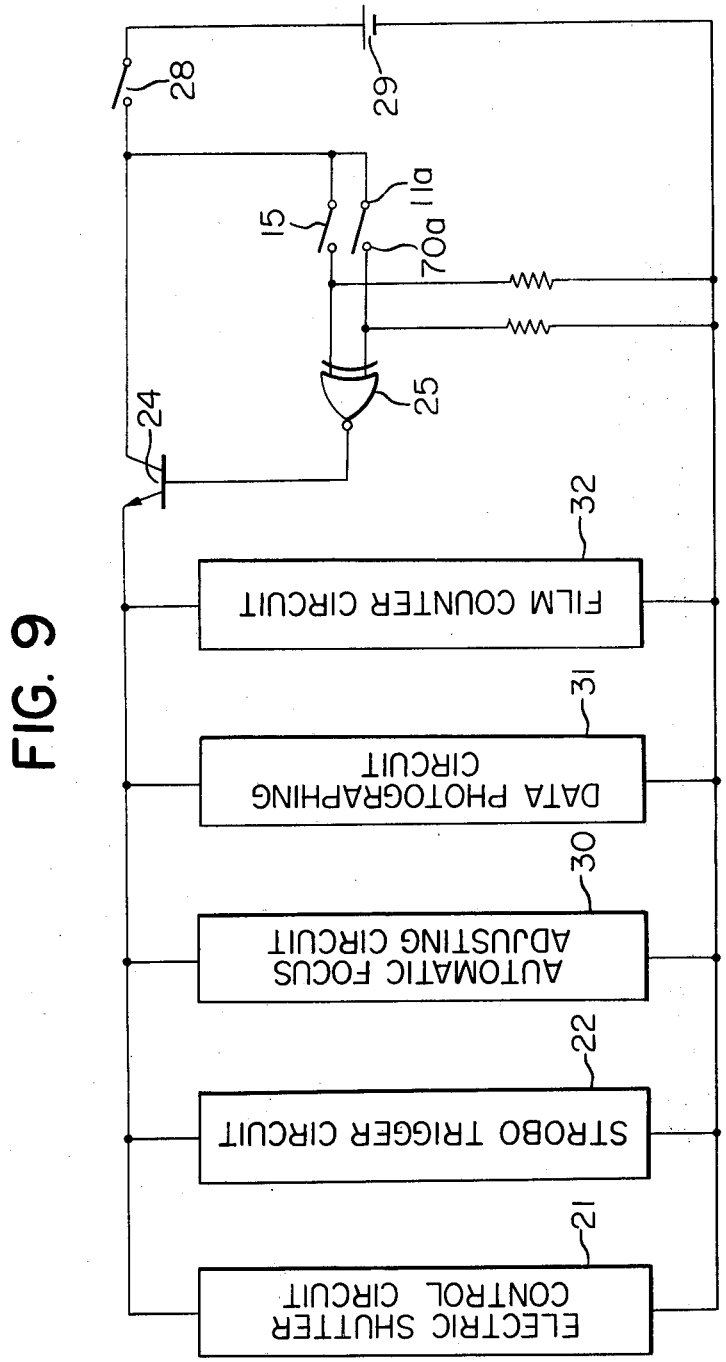
FIG. 9 is a diagram of the electric circuit in the second embodiment.

Reference is now had to FIGS. 8 and 9 to describe a second embodiment of the present invention constructed so that the release lock operation is electrically carried out.

In FIG. 8, a normally closed switch 15 is opened by the contact of the insulatng projection 13a of a magazine detecting member 13 with a switch piece 15a, the magazine detecting member 13 being pivotally moved by the film magazine 9 contained in the containing chamber of the camera. When the magazine 9 is not contained in the magazine chamber, the member 13 is clockwisely rotated about a pivot 13b by the bias force of a spring 14 to break said contact. Accordingly, the switch 15 closes from its own habit. A film guide 40 is biased counter-clockwisely by a spring 12. The terminal 11a of a switch piece 11 attached to the film guide 40 and a conductive portion 70a provided around the upper end of a spool 70 together form a switch, which is opened by the wider portion 8b of the film 8 coming in between the terminal 11a and the conductive portion 70a.

In FIG. 9, a switch 28 opened and closed in response to depression of the release button and a transistor 24 control the power supply to an electric shutter control circuit 21, a strobo trigger circuit 22, an automatic focus adjusting circuit 30, a data photographing circuit 31 and a film counter circuit 32. In this case, the shutter mechanism is provided with a well-known construction in which the shutter mechanism is locked when power is not supplied to the electric shutter control circuit 21 and the electromagnet thereof is not energized. The transistor 24 is switching-driven by an exclusive logic sum negating circuit 25 having two inputs controlled by a magazine presence detecting switch 15 and film take-up detecting switches 11a, 70a.

When the presence of the film magazine 9 is detected and the detecting switch 15 is opened and the wider portion 8b of the film 8 closes the detecting switches 11a, 70a, the output of the circuit 25 assumes low level and the transistor 24 does not conduct even if the release switch 28 is closed, and therefore the shutter control circuit 21 does not operate. Accordingly, the shutter is release-locked.

When the film 8 is positively taken up, the wider portion 8b of the film 8 opens the switches 11a and 70a. Accordingly, the output of the circuit 25 assumes high level and the transistor 24 conducts to operate the electric shutter control circuit 21, and the release lock of the shutter is released.

According to the second embodiment, the well-known various circuits 21, 22, 30, 31 and 32 necessary only during photography become operative after the positive take-up of the film 8 has been detected and thus, the power consumed can be reduced.

Both in the first and the second embodiment, the release lock of the shutter is released when there is no film magazine contained in the containing chamber of the camera. Also, at that time, the film counter mechanism in the first embodiment and the various circuits in the second embodiment which are necessary only during photography also operate and thus, the idle photographing for checking up the operations of the various parts of the camera becomes possible. At this time, pointers 5c and 13c respectively provided on the magazine detecting members 5 and 13 in the first and second embodiments indicate the presence of a loaded film by index marks a and b. Accordingly, by observing this display, the photographing operation and the idle photographing operation before the film loading can be distinguished from each other.

Also, in the first and second embodiments, the shutter is release-locked until the wider portion 8b of the film is wound on the spool 7. Accordingly, an idle feeding mechanism is provided which enables only the film wind-up to be effected without the shutter release taking place during that time. This idle feeding mechanism is a mechanism which renders the conventional multiplex wind-up preventing mechanism inoperative. It is desirable that this idle feeding mechanism be rendered inoperative in response to the detecting mechanism for the wider portion 8b of the film.

Where the film take-up operation is effected by a motor in the first and second embodiments, the motor may preferably be controlled in response to the detecting mechanism for the wider portion 8b of the film.

In the embodiments, the present invention has been shown with respect to a case where it is incorporated in an easy load device, whereas the present invention is not restricted thereto but a similar effect may be obtained even if it is used in a conventional camera of the type in which the film leader portion is inserted into the spool. Further, the mechanism for detecting the taken-up condition of the film is not restricted to that of the embodiments, but a conventional mechanism, for example, a mechanism for detecting the take-up torque, is applicable.

We claim:

1. In a film feeding device of a camera including a take-up spool adapted to be rotated by a wind-up operating device to thereby take up on the outer periphery thereof a roll film loaded into a supply chamber, said film having an image recording portion and a leader portion of a smaller width than said recording portion, said image recording portion being taken up in subsequence to the take-up of said leader portion onto said take-up spool, said take-up spool having an outer peripheral surface which is not covered with said leader portion but can be covered only with said image recording portion, the improvement comprising:
   (a) means cooperable with the outer peripheral surface of said take-up spool to detect the take-up of the film, said detecting means including signal means (7a, 70a) provided on said outer peripheral surface, and signal detecting means (4a, 11a) engageable with said signal means and removed from said outer peripheral surface by the intervention of said image recording portion of the film with respect to said outer peripheral surface; and
   means (3, 12) for biasing said signal detecting means in the direction of engagement thereof with said signal means.

2. In a camera including a film feeding device including a take-up spool adapted to be rotated by a wind-up operating device to thereby take up on the outer periphery thereof a roll film loaded into a supply chamber, and a shutter device for effecting the light-interception to said film and the exposure control, said film having an image recording portion and a leader portion of a smaller width than said recording portion, said image recording portion being taken up in subsequence to the take-up of said leader portion onto said take-up spool, said take-up spool having an outer peripheral surface which is not covered with said leader portion but can be covered only with said image recording portion, the improvement comprising:
- (a) means cooperable with the outer peripheral surface of said take-up spool to detect the take-up of the film, said detecting means including signal means (7a, 70a) provided on said outer peripheral surface, and signal detecting means (4a, 11a) engageable with said signal means, the engagement of said signal detecting means with said signal means being broken by the intervention of the image recording portion of said film with respect to said outer peripheral surface, and
- (b) shutter restraining means (2, 24) operatively associated with said detecting means to restrain the operation of said shutter device during the engagement of said signal detecting means with said signal means and to release said restraint when said engagement is broken.

3. A film feeding device according to claim 1 or 2, further including drive means (20) for moving said roll film toward said take-up spool, and a film guide member (4, 40) having a surface for guiding the leading end of the film moved by said drive means, said film guide member being movable so that one side of said surface comes into contact with the outer periphery of said take-up spool, said signal detecting means being provided on said film guide member.

4. A film feeding device according to claim 3 wherein said signal means includes a groove (7a) formed circumferentially of said take-up spool, and said signal detecting means includes a projection (4a) capable of fitting into said groove.

5. A film feeding device according to claim 3, wherein said signal means includes a conductor (70a) provided in the form of a ring band on said take-up spool circumferentially thereof, and said signal detecting means includes an electrical contact (11a) capable of contacting said conductor.

6. In a camera including a film feeding device including a take-up spool adapted to be rotated by a wind-up operating device to thereby take up on the outer periphery thereof a roll film loaded into a supply chamber, and a shutter device for effecting the light-interception to said film and the exposure control, the improvement comprising:
- (a) take-up detecting means for generating an output when the winding of said film round said take-up spool has been completed; and
- (b) shutter restraining means for restraining the operation of said shutter device, said shutter restraining means releasing said restraint in response to the output of said take-up detecting means.

7. A camera according to claim 2 or 6, wherein said shutter device includes an electric shutter control circuit and said shutter restraining means includes switch means (24) provided in the power supply circuit to said control circuit.

8. A camera according to claim 2 or 6, further including cancel means (5, 13-15) acting on said shutter restraining means so as to block the actuation restraining operation of said shutter device by said shutter restraining means, said cancel means stopping its operation in response to the loading of the film into said supply chamber.

9. A camera according to claim 8, wherein said cancel means includes an operating member (5, 13) having a contact projected into said supply chamber to detect the loading of the film, said operating member being movable in a direction to retract said contact and liberating said shutter restraining means by said movement.

10. A camera according to claim 8, further including:
- (a) means (a,b,5c) for displaying the loaded condition of the film into the camera; and
- (b) means operatively associated with said cancel means to drive said display means.

* * * * *